United States Patent Office 3,126,356
Patented Mar. 24, 1964

3,126,356
PENTAERYTHRITOL CONDENSATION PRODUCTS AND THEIR PREPARATION
William M. Kraft, Verona, N.J., assignor to Heyden Newport Chemical Corporation, New York, N.Y., a corporation of Delaware
No Drawing. Filed Aug. 19, 1958, Ser. No. 755,857
6 Claims. (Cl. 260—22)

This invention relates to pentaerythritol condensation products and to the procedure by which they are prepared. It also relates to the preparation of alkyd resins from these condensation products.

Alkyd resins, which are the products of the reaction of polyhydric alcohols with polycarboxylic acids and monocarboxylic acids, are widely used in the formulation of architectural finishes and other surface-coating materials because of their excellent drying characteristics, durability, and adhesion to metal and other surfaces. Alkyd resins prepared from pentaerythritol and dipentaerythritol are especially desirable in surface-coating compositions because they body and dry rapidly, are glossy, and show good resistance to water and to alkalies. In general the resins prepared from dipentaerythritol are superior to those containing pentaerythritol in such properties as hardness and alkali resistance.

Since it is obtained commercially only as a by-product in the manufacture of pentaerythritol, the amount of dipentaerythritol produced is limited, and this polyhdric alcohol is not always available for use in the manufacture of alkyd resins. Attempts have been made to prepare dipentaerythritol and related ether alcohols by dehydrating pentaerythritol in the presence of sulfuric acid, phosphoric acid, or p-toluenesulfonic acid according to the following equation:

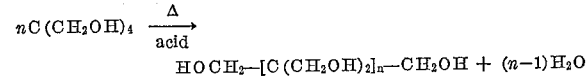

The products resulting from this reaction, however, are mixtures of highly functional, high molecular weight pentaerythritol condensation products, such as octapentaerythritol (18 hydroxyl groups; molecular weight 963) and decapentaerythritol (22 hydroxyl groups; molecular weight 1,199). When these products are used in the preparation of alkyd resins, the highly functional ether alcohols react rapidly with the acids present to form large, relatively insoluble ester molecules, and the resins tend to gel before esterification has been completed. Dried films of such alkyd resins are generally softer and less resistant to water and to alkalies than are those prepared from pentaerythritol or dipentaerythritol.

This invention relates to a procedure by which pentaerythritol condensation products are formed that have relatively low molecular weight and relatively low functionality. Alkyd resins and synthetic drying oils prepared from these products have physical properties similar to those of the corresponding dipentaerythritol products.

It has been found that when pentaerythritol is dehydrated in the presence of an acidic cation exchange resin products are formed that when esterified are light in color and have properties similar to those of the corresponding dipentaerythritol products. Useful acidic cation exchange resins include the nuclear sulfonated polystyrene cation exchange resins in the hydrogen cycle. One resin that has given excellent results in this condensation is a sulfonated copolymer of styrene and divinylbenzene, which is marketed as "Amberlite IR–120" by Rohm & Haas Co.

The amount of cation exchange resin used as dehydration catalyst may vary from about 1% to 8% by weight of pentaerythritol present, with 3% to 6% most often used. Somewhat larger or smaller amounts of catalyst may also be used.

The condensation reaction is carried out by heating a mixture of pentaerythritol and the cation exchange resin until approximately 0.25 to 0.75 mole of water has been evolved for each mole of pentaerythritol in the mixture. The preferred products are obtained when the amount of water evolved is between 0.35 and 0.55 mole per mole of pentaerythritol.

The reaction is generally carried out at 190°–240° C., with approximately 200°–220° C. the preferred range. At temperatures below those specified, the condensation takes place too slowly to be of commercial importance; at higher temperatures, some decomposition and discoloration of the product may occur.

When the condensation reaction has been completed, the cation exchange resin catalyst may be separated from the product by filtration or any other suitable means. Alternatively the resin catalyst may be allowed to remain in the product and to be present during subsequent esterification reactions. In such a case the acidic resin may act as a catalyst for the esterification. The resin may then be separated from the ester or alkyd resin formed. The recovered cation exchange resin may be reused after it has been washed with an acid to return it to the hydrogen cycle.

The pentaerythritol condensation products prepared in accordance with this invention are mixtures of pentaerythritol and its lower condensation products which mixtures usually contain approximately 20% to 35% of the lower condensation products although they may contain 20% to 75% of such lower condensation products. These mixtures have hydroxyl contents of approximately 35–41%. Alkyd resins may be made by esterifying the products of this invention with polycarboxylic acid, such as phthalic anhydride, and monocarboxylic acid, which includes fatty acids containing 4 to 20 carbon atoms, such as tall oil fatty acids or soybean oil fatty acids, and also aromatic acids, such as benzoic acid.

As compared with procedures for the preparation of pentaerythritol condensation products wherein pentaerythritol is heated with such strong acids as sulfuric acid, phosphoric acid, or p-toluenesulfonic acid, the procedure of this invention has the following advantages: the condensation products obtained and the alkyd resins derived from these condensation products are appreciably lighter in color; the catalyst may be readily separated from the product by filtration; the catalyst recovered may be regenerated and reused in subsequent condensations; the product contains little of the higher condensation products of pentaerythritol and as a result forms alkyd resins having excellent physical properties.

This invention is illustrated by the examples that follow:

Example 1

A pentaerythritol condensation product was prepared by heating 435 grams (3 moles) of pentaerythritol with 20 grams of a cation exchange resin at 200°–214° C. for 2 hours during which time 21 cc. (1.17 moles) of water was evolved. The cation exchange resin was a nuclear sulfonated copolymer of styrene and divinylbenzene available commercially as "Amberlite IR–120" (Rohm & Haas Co.). The resin was in the hydrogen cycle. The product contained approximately 25% of pentaerythritol polymer-like compounds after it had been filtered while hot to remove the catalyst.

Example 2

A pentaerythritol condensation product was prepared by heating 435 grams (3 moles) of pentaerythritol with 20 grams of "Amberlite IR–120" at 205°–210° C. for 2.5 hours during which time 28 cc. (1.56 moles) of water was evolved. The product, which contained approximately 30% of pentaerythritol polymer-like compounds, had a hydroxyl content of 38.08%.

*Example 3*

An alkyd resin containing 20% dibasic acid was prepared by heating a mixture of 80 grams of phthalic anhydride, 87.6 grams of the product of Example 2, 240 grams of tall oil fatty acids, and 20 cc. of xylene at 245° C. for 4.5 hours. The resin had an acid number of 11.6 and when thinned to 60% solids with mineral spirits a Gardner viscosity of Y. This resin which dried tack-free in 2.55 hours, had film properties similar to those of the corresponding dipentaerythritol alkyd resin.

I claim:

1. The process comprising forming a mixture of pentaerythritol with a catalytic amount of a strongly acidic nuclear sulfonated polystyrene cation exchange resin and heating said mixture at 190° to 240° C. until approximately 0.25 to 0.75 mole of water has been evolved for each mole of pentaerythritol in the mixture thereby forming a polyhydric alcohol composition which is a mixture of pentaerythritol and pentaerythritol dehydration products, said mixture containing from 20 to 75% of said pentaerythritol dehydration products and having a hydroxyl content in the range of 35 to 41%.

2. The process comprising forming a mixture of pentaerythritol with a catalytic amount of a nuclear sulfonated styrene-divinylbenzene copolymer cation exchange resin in the hydrogen cycle and heating the mixture at 190° to 240° C. until approximately 0.25 to 0.75 mole of water has been evolved for each mole of pentaerythritol in the mixture thereby forming a polyhydric alcohol composition which is a mixture of pentaerythritol and pentaerythritol dehydration products, said mixture containing from 20 to 75% of said pentaerythritol dehydration products and having a hydroxyl content in the range of 35 to 41%.

3. The process comprising forming a mixture of pentaerythritol with a nuclear sulfonated styrene-divinylbenzene copolymer cation exchange resin in the hydrogen cycle, the amount of said cation exchange resin in the mixture being approximately 1–8% by weight, and heating the mixture at 200° to 220° C. until approximately 0.25 to 0.75 mole of water has been evolved for each mole of pentaerythritol in the mixture thereby forming a polyhydric alcohol composition which is a mixture of pentaerythritol and pentaerythritol dehydration products, said mixture containing from 20 to 75% of said pentaerythritol dehydration products and having a hydroxyl content in the range of 35 to 41%.

4. The process comprising forming a mixture of pentaerythritol with a nuclear sulfonated styrene-divinylbenzene copolymer cation exchange resin in the hydrogen cycle, the amount of said cation exchange resin in the mixture being approximately 3 to 6%, and heating the mixture at 200° to 220° C. until approximately 0.35 to 0.55 mole of water has been evolved for each mole of pentaerythritol in the mixture thereby forming a polyhydric alcohol composition which is a mixture of pentaerythritol and pentaerythritol dehydration products, said mixture containing from 20 to 75% of said pentaerythritol dehydration products and having a hydroxyl content in the range of 35 to 41%.

5. In the process of producing light-colored alkyd resins the steps comprising heating pentaerythritol with approximately 1 to 8% of a nuclear sulfonated styrene-divinylbenzene copolymer cation exchange resin in the hydrogen cycle at 190° to 240° C. to evolve approximately 0.25 to 0.75 mole of water per mole of pentaerythritol thereby forming a polyhydric alcohol composition which is a mixture of pentaerythritol and pentaerythritol dehydration products, said mixture containing 20 to 75% of said pentaerythritol dehydration products and having a hydroxyl content in the range of 35 to 41%, heating said polyhydric alcohol composition with a monocarboxylic acid selected from the group consisting of fatty acids containing 4 to 20 carbon atoms, mononuclear aromatic acids, and mixtures thereof and a polycarboxylic acid to form an alkyd resin containing said cation exchange resin, and thereafter separating the cation exchange resin from the alkyd resin.

6. In the process of producing light-colored alkyd resins the steps comprising heating pentaerythritol with approximately 3 to 6% of a nuclear sulfonated styrene-divinylbenzene copolymer cation exchange resin in the hydrogen cycle at 200° to 220° C. to evolve approximately 0.35 to 0.55 mole of water per mole of pentaerythritol thereby forming a polyhydric alcohol composition which is a mixture of pentaerythritol and pentaerythritol dehydration products, said mixture containing 20 to 75% of said pentaerythritol dehydration products and having a hydroxyl content in the range of 35 to 41%, heating said polyhydric alcohol composition with fatty acids containing 4 to 20 carbon atoms per molecule and phthalic anhydride to form an alkyd resin containing said cation exchange resin, and thereafter separating the cation exchange resin from the alkyd resin.

References Cited in the file of this patent

UNITED STATES PATENTS

| 2,315,708 | Hovey et al. | Apr. 6, 1943 |
| 2,345,528 | Bradley | Mar. 28, 1944 |

OTHER REFERENCES

Martin: Paint Manufacturing, volume 15, April 1945, pages 89–92.

Rohm & Haas Company, "Amberlite IR–120 (H)," Analytical Grade M–6–50 (revised September 1950), March 1951.